United States Patent
Kashmiri et al.

(10) Patent No.: US 6,339,951 B1
(45) Date of Patent: Jan. 22, 2002

(54) LEAK DETECTION AND STRUCTURAL ASSESSMENT

(75) Inventors: Ray Reza Kashmiri, Albuquerque; George H. Kitchen, III, Rio Rancho; Manuel Johnny Peck, Albuquerque, all of NM (US)

(73) Assignee: International Lubrication & Fuel Consultants, Inc., Rio Rancho, NM (US)

( * ) Notice: Subject to any disclaimer, the term of this patent is extended or adjusted under 35 U.S.C. 154(b) by 0 days.

(21) Appl. No.: 09/363,317

(22) Filed: Jul. 28, 1999

(51) Int. Cl.⁷ .................. G01M 3/20; G01M 3/32; G01N 23/204

(52) U.S. Cl. ............. 73/40; 73/49.2 T; 73/49.2 R; 340/605

(58) Field of Search ............. 73/40, 49.2, 49.2 R, 73/49.3, 40.5 R, 49.2 T; 340/605

(56) References Cited

U.S. PATENT DOCUMENTS

| | | | |
|---|---|---|---|
| 3,505,820 A | * 4/1970 | Draper et al. .............. 61/1 |
| 4,471,651 A | * 9/1984 | Dimeff et al. .......... 73/40.5 R |
| 4,618,855 A | * 10/1986 | Harding et al. ............ 340/605 |
| 4,709,577 A | * 12/1987 | Thompson ................. 73/40.7 |
| 4,728,941 A | * 3/1988 | Andrejasich ............... 340/620 |
| 4,770,028 A | 9/1988 | Flippo |
| 4,896,528 A | 1/1990 | Lewis |
| 4,916,939 A | * 4/1990 | Mögel ..................... 73/49.2 |
| 5,048,324 A | 9/1991 | Thompson |
| 5,052,215 A | * 10/1991 | Lewis .................... 73/40.5 A |
| 5,096,087 A | 3/1992 | Thomas |
| 5,152,859 A | * 10/1992 | Sharp ..................... 156/172 |
| 5,155,356 A | 10/1992 | Peters et al. |
| 5,269,172 A | * 12/1993 | Diagle et al. ............... 73/40.7 |
| 5,284,048 A | * 2/1994 | Horner .................... 73/49.2 |
| 5,305,631 A | 4/1994 | Whited et al. |
| 5,347,850 A | 9/1994 | Tuma |
| 5,473,935 A | * 12/1995 | Richter .................. 73/40.5 R |
| 5,767,390 A | 6/1998 | Chapman, IV |
| 5,922,943 A | * 7/1999 | Chapman, IV ............. 73/40.7 |

* cited by examiner

*Primary Examiner*—Hezron Williams
*Assistant Examiner*—David J. Wiggins
(74) *Attorney, Agent, or Firm*—Deborah A. Peacock; Jeffrey D. Myers; Nancy E. Ownbey

(57) ABSTRACT

An apparatus for detecting structural integrity and localizing leaks from fluid storage holding structures, such as fuel supply storage tanks and fluid carrying pipelines. The invention comprises at least one reference electrode or material and at least one sample collection container containing an absorbent/adsorbent material. The sample container is positionally moveable within at least one perforated pipe disposed below the fluid holding structure. Leaking substances from the holding structure flow into the perforated pipe, into the sample container, and are absorbed/adsorbed. By removing the sample container from the pipe, the quantity, quality and position of the leak is detected.

64 Claims, 3 Drawing Sheets

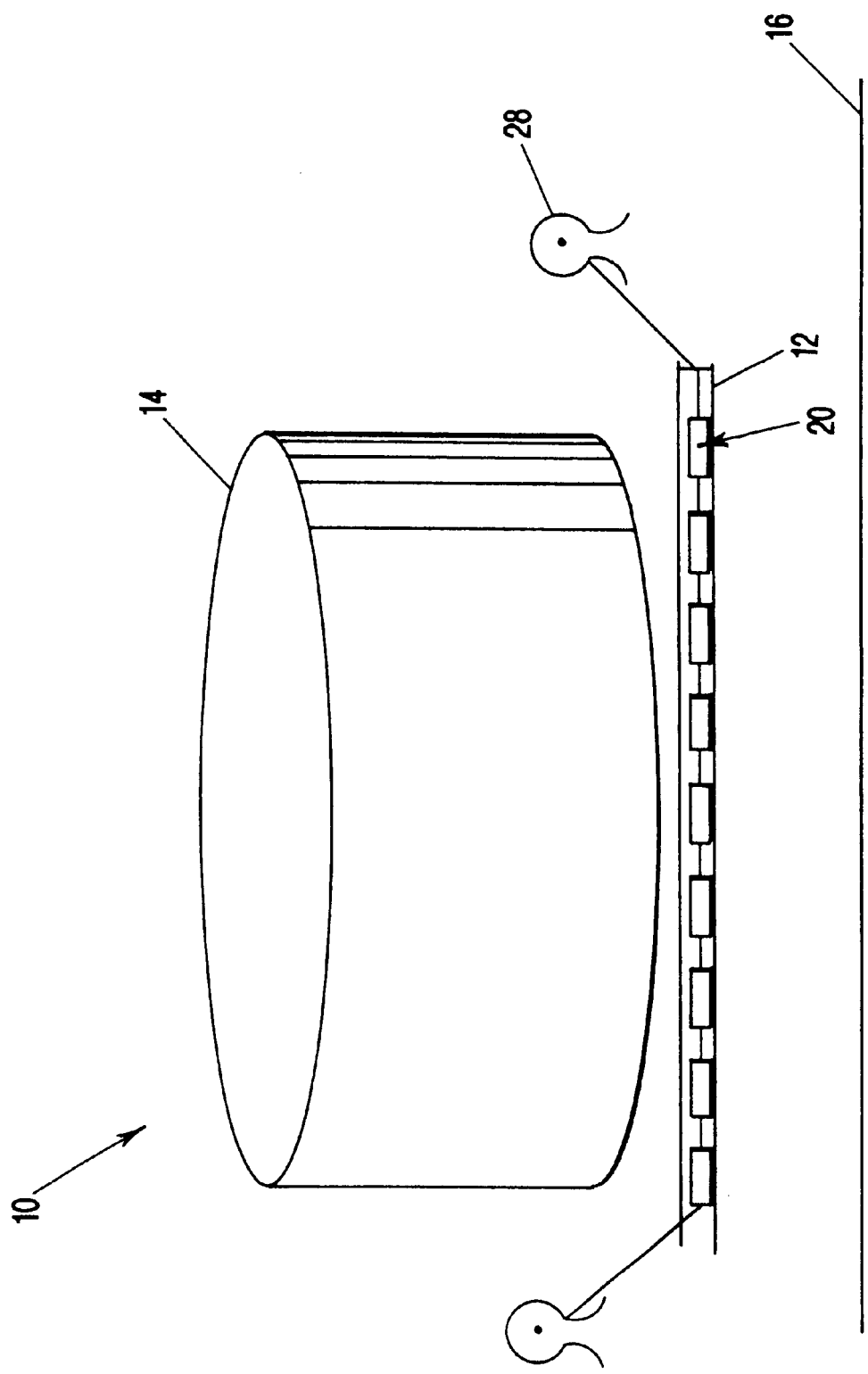

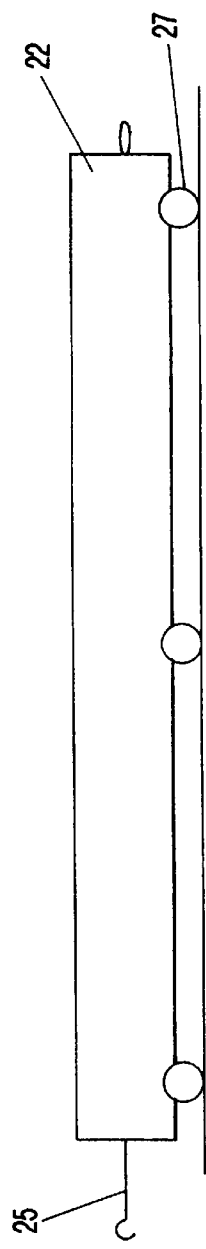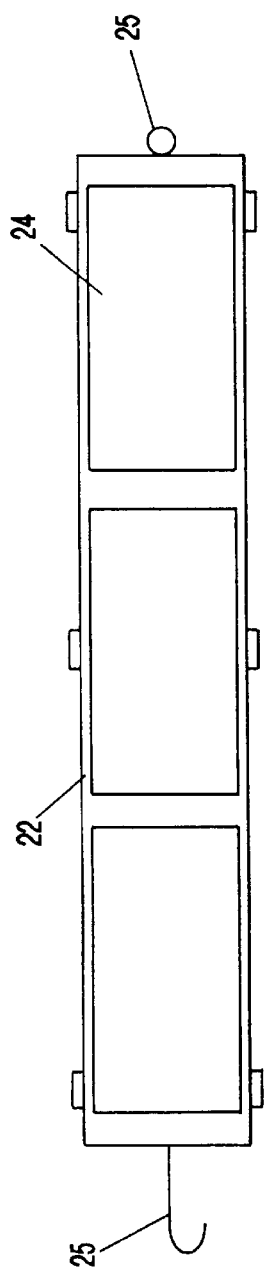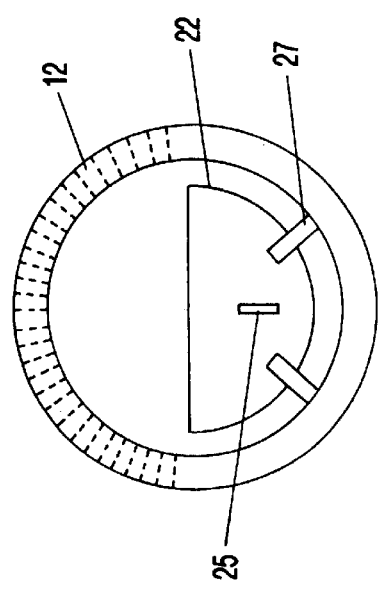

LEAK DETECTION AND STRUCTURAL ASSESSMENT

BACKGROUND OF THE INVENTION

1. Field of the Invention (Technical Field)

The present invention relates to an apparatus for assessing the structure and detecting leaks underneath fluid storage tanks, other holding structures or fluid carrying pipelines. The present invention is also a method for using the apparatus for assessing and detecting leaks.

2. Background Art

Many different substances, such as water, chemical products, agricultural products, petroleum products, and waste have been stored or isolated in tanks or landfills, either on the surface of or below ground. Prolonged exposure to the environment tends to create the potential for leaks, leading to the possibility of contamination of soil and groundwater supplies, as well as the loss of the stored resource itself. Environmental regulations have become increasingly stringent in efforts to prevent such contamination. As a result, it has become imperative to detect leaks early, so as to avoid costly cleanup and perhaps irreversible damage.

Several inventions have been developed to detect leaks in storage tanks. Among these are U.S. Pat. No. 5,767,390, to Chapman, entitled System and Method for Storage System Leak Detection; and U.S. Pat. No. 4,770,028, to Flippo, entitled Hydrocarbon Tank Leak Detection System. These systems required the leaked substance to somehow reach the vertical tube. Not only did this eliminate the possibility of determining the location of the leak, but also the increased amount of leaked substance potentially necessary to reach the vertical monitoring well created a much larger amount of contamination to be cleaned and/or detoxified.

To help increase the sensitivity of the detection device, several inventions placed the monitoring pipes underneath the tanks. These devices included U.S. Pat. No. 5,305,631, to Whited et al., entitled Cathodic Protection and Leak Detection Process and Apparatus; U.S. Pat. No. 5,155,356, to Peters et al., entitled Apparatus and Method for Detecting Subterranean Leakage from a Large Storage Vessel. These devices detected leaks by the use of anodes or moisture-detecting probes, and do not sample the leaked substance.

U.S. Pat. No. 5,347,850, to Tuma, entitled Method for Detecting and Localizing Leaks in Above Ground Storage Tanks; U.S. Pat. No. 5,048,324, to Thompson, entitled Aboveground Tank Leak Detection System and Method, and U.S. Pat. No. 4,896,528, to Lewis, entitled Tank Bottom Leak Testing and Apparatus, also disclose the use of pipes placed beneath the tank. However, these inventions do not allow for precise localization of the leak, as they require the leaked substance be evacuated by air or vacuum. Due to the relatively short period of time the vacuum is activated, and the fact that such vacuum systems also lack a concentrating mechanism, the leaked substance may travel away from, rather than towards the sampling well or pipe.

U.S. Pat. No. 5,096,087, to Thomas, entitled Double Containment and Leak Detection Apparatus, discloses a method of detecting a leak within a tank in an internal baffle, and is not relevant.

Localization of the leak is a key issue when dealing with large holding structures—the cost of total replacement is often prohibitive. The ability to determine location of the leak would be cost-effective both in terms of repair and cleanup.

The present invention is an apparatus and method for detecting leaks underneath holding structures. It may also be used to detect pipeline leaks. It successfully addresses the need for localization of leak detection, through the use of movable sampling units underneath the holding structures. The construction of the present invention results in an apparatus that is itself both inexpensive and easily monitored.

SUMMARY OF THE INVENTION
(DISCLOSURE OF THE INVENTION)

A preferred embodiment of the present invention comprises an apparatus for detecting leaks of holding structures, the apparatus comprising at least one perforated pipe disposed underneath the holding structure, and at least one sample container removably positionable within the pipe. The pipe is preferably disposed horizontally beneath the holding structure, and preferably disposed above a liner underneath the holding structure. Preferably, there is a plurality of pipes disposed approximately 1–8 feet apart. Preferably, the perforation style is slots, holes, or other apertures. The sample container preferably comprises a collection receptacle for dirt surrounding the pipe.

In a preferred embodiment of the apparatus, the sample container comprises a second pipe slidable in the perforated pipe. Alternatively, a plurality of sample containers are disposed at intervals within the pipe, and further comprise a location delineator for identification of positioning of the sample containers, and consequently identification of the location of the leak. Preferably, the sample containers are in series, preferably detachably connected to each other. The sample container comprises at least one wheel, or alternatively comprises a low-friction, slidable bottom surface, preferably Teflon®.

In a preferred embodiment of the present invention, the sample container comprises an absorbent/adsorbent material disposed within, preferably comprising bentonite, sand, or water, and further comprises a compound indicator in the sample container for detecting a compound provided to the substance in the holding structure which is leaking. Alternatively, the apparatus further comprises a reference material in the sample container for determining differences in potential. In an alternative embodiment, the sample container comprises a reference electrode.

A preferred embodiment of the present invention further comprises a disposing and retrieving device for the sample containers to be disposed and retrieved in the pipe, and preferably comprises a loop, hook or magnet on at least one end for retrieving the container. The disposing and retrieving device preferably comprises cable, string or cord.

A preferred embodiment further comprises a disposing and retrieving activator to which the disposing and retrieving device is attached, preferably a spool, and preferably an independently-controlled activator for each pipe. Preferably, the independently-controlled activators share a common spool.

The present invention is also a method for detecting leaks from holding structures, the method comprising the steps of placing at least one pipe underneath the holding structure, disposing at least one sample container within the pipe, collecting at least one sample from around the pipe into the sample container, retrieving the sample container, and analyzing the sample to detect the leaked substance. Preferably, a perforated pipe is placed underneath the holding structure, and preferably above a liner underneath the holding structure. The step of placing at least one pipe underneath the holding structure preferably comprises placing more than one pipe approximately 1–8 feet apart underneath the holding structure, preferably horizontally underneath the holding structure.

In a preferred embodiment of the present invention, the step of disposing at least one sample container within the pipe comprises disposing at least one sample container comprising an absorbent/adsorbent material, and preferably comprises disposing sample containers in series, preferably at intervals, and preferably where the sample containers are detachably connected to each other. Alternatively, the sample container comprises a second pipe slidable in the perforated pipe. Preferably, the sample container comprises a location delineator for identification of placement within the pipe. In a preferred embodiment, the sample container comprises at least one wheel, and alternatively comprises a low-friction bottom surface or a curved bottom surface.

A preferred embodiment of the present invention comprises collecting at least one sample from around the pipe into an absorbent/adsorbent material, preferably bentonite, sand or water. Additionally, collecting at least one sample further comprises collecting in a container comprising a compound indicator, and preferably additionally comprises collecting in a container comprising a reference material.

Alternatively, the invention comprises collecting in a container comprising a reference electrode. Alternatively, the invention comprises collecting the dirt that passes through the perforations.

In a preferred embodiment of the present invention, retrieving the sample cars comprises retrieving with a disposing and retrieving device, preferably retrieving the sample container comprising a loop, a hook, or a magnet on at least one end, and preferably retrieving with cable, string, or cord. The sample container is preferably retrieved with at least one pull connected to at least one retracting activator, preferably a spool, and preferably where each pipe has at least one pull connected to at least one independently-controlled activator. Preferably, the sample containers are retrieved with more than one pull connected to a common spool.

Preferably, the step of analyzing the sample to detect the leaked substance comprises analyzing the absorbent/adsorbent material. Alternatively, the dirt that passes through the perforations is analyzed. Preferably, the step of analyzing the sample comprises analyzing to detect a compound indicator in the substance, and additionally preferably comprises analyzing the sample to detect a reference material in the substance. Preferably, the sample is analyzed to detect the age of the substance. Alternatively, the sample is analyzed to detect the composition of the substance, preferably using an extraction solvent, and more preferably an extraction material. The sample is preferably analyzed to detect the stored material. Additionally, the step of analyzing the sample to detect the leaked substance comprises detecting the source of the substance, preferably whether from a holding structure, a water table, or the environment. Preferably, analyzing the sample detects the volume of the leak.

A primary object of the present invention is to provide an apparatus for detecting leaks under storage tanks or landfills.

Another object of the present invention is to provide an apparatus for localizing the leaks.

A further object of the present invention is to provide an apparatus for leak detection that is easily monitored and allows for assessing the structural integrity.

Yet another object of the present invention is to provide an apparatus for leak detection that is inexpensive to produce.

Still a further object of the present invention is to provide a method of leak detection that is simple and inexpensive.

A primary advantage of the present invention is the ability to localize leaks.

Another advantage of the present invention is the ability to directly sample the leaked substance.

A further advantage of the present invention is the ability to maneuver the sampling cars.

Yet another advantage of the present invention is the prolonged exposure time, thus increasing ability to detect slow or minute leaks.

Still a further advantage of the present invention is the ability to change types of detecting substances.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is cross-sectional view showing the pipe placed underneath the holding structure; and FIG. 2 is side view of a sample container; and FIG. 3 is a top view of a sample container showing the absorbent/adsorbent material; and FIG. 4 is a cross-sectional view of a sample container disposed within a pipe.

Figure 5:
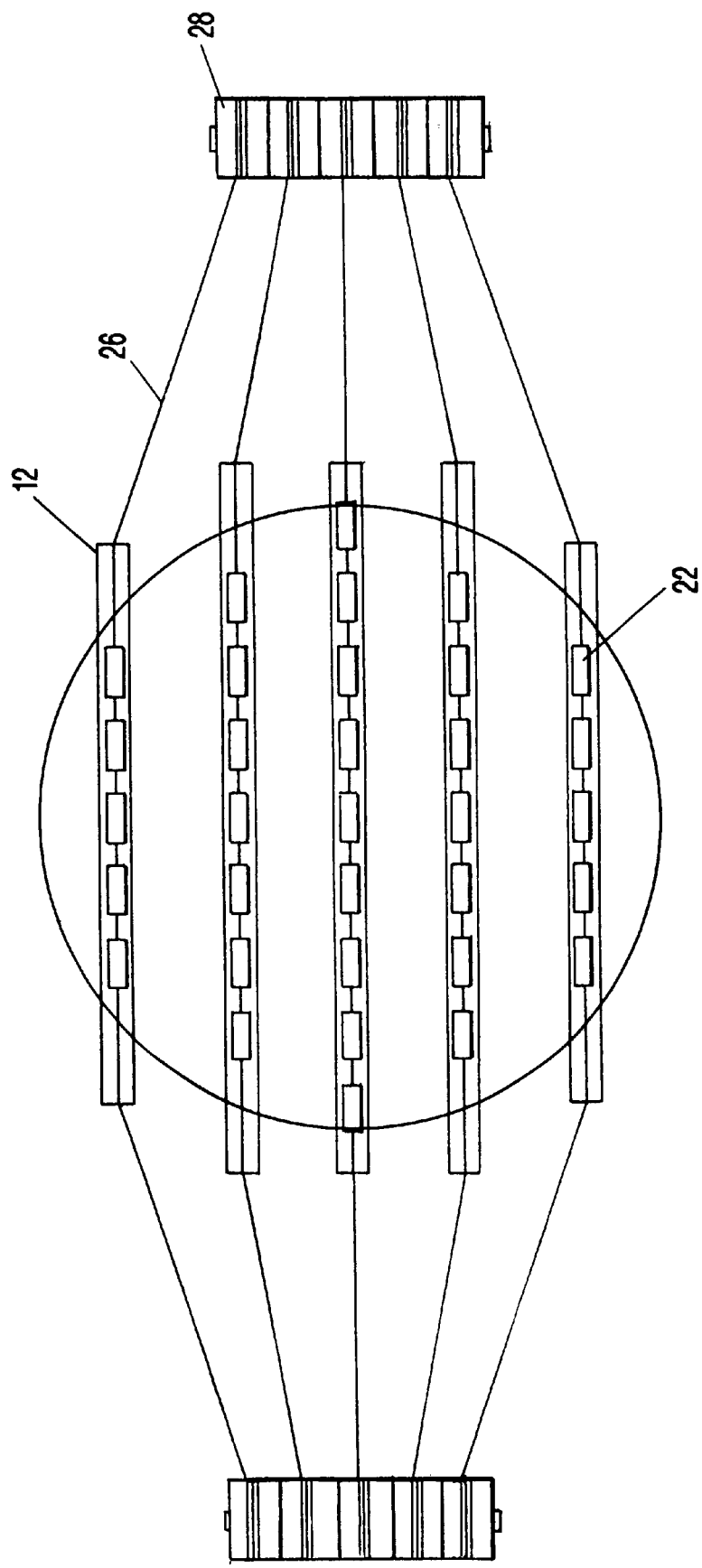
FIG. 5 is a top view of a holding structure having multiple pipes disposed horizontally underneath at regular intervals.

DESCRIPTION OF THE PREFERRED
EMBODIMENTS (BEST MODES FOR
CARRYING OUT THE INVENTION)

A preferred embodiment of the apparatus is shown in FIGS. 1–5. As shown in FIG. 1, leak detector 10 comprises perforated pipe 12 preferably disposed horizontally below a holding structure or other vessel. The term "perforations" as used throughout the specification and claims is intended to include large openings as well as permeable and semi-permeable membrane openings. Perforations include, but are not limited to, slots, holes, or other apertures. Preferably at least one end of pipe 12 leads to and ends at or above ground level, to retrieve samples. Pipe 12 is disposed preferably between holding structure 14 and liner substance 16, more preferably approximately 1–5 feet below the bottom of the holding structure, but alternatively may be placed below the liner (e.g. a permeable liner) for detection of leaks at that location, as well. Pipe 12 has a diameter of preferably one to three inches, although other diameters may be used. Perforations in the pipe walls allow the leaked substance to enter into the pipe and be detected.

The term "pipe" as used throughout the specification and claims, is intended to include rigid, semi-rigid, or flexible pipe with a circular, square, rectangular, or other shape. Removably situated in pipe 12 are multiple sample containers 20.

For tanks (as opposed to pipelines), pipes are preferably placed apart underneath the tank, as shown in FIG. 5. They may be positioned close or far apart. A positioning of 1–8 feet is preferable. Alternatively, for leak detection under pipelines, a single pipe may be utilized. In addition, additional pipes are placed but may be left empty for future use.

Perforated pipes may be placed under the holding structure prior to installation. Or the perforated pipe may be retrofitted in existing sites, using standard horizontal drilling techniques. In the claims and specification as set forth, the term "holding structure" is defined as including but not limited to storage tanks, landfills, and pipelines.

As shown in FIG. 2, the preferred sample container is in the form of sample containers or cars 22. Sample cars are preferably detachably connected in a series, and are preferably regularly spaced. Alternatively, sample cars may be spaced at predetermined sites and intervals at suspected leak sites via a location delineator. Sample cars provide the advantage of detecting the quantity, quality and position of the leak.

In a preferred embodiment of the present invention, sample cars 22 are filled with adsorbent/absorbent material 24, shown in FIG. 3, preferably comprising bentonite, although sand, water or other absorbent/adsorbent materials may be used, and chosen to eliminate the possibility of reaction between material and the substance to be detected. The material may also include an indicator that changes color if a compound, such as Fl/Cl, within the holding structure substance to be detected contacts it. This requires that the compound be placed previously within the holding structure substance. The material may alternatively or additionally contain a reference electrode or material to determine differences in potential, or a corrosion coupon to determine the corrosion activity. Also, the material may incorporate a pH meter or a moisture detector.

In an alternative embodiment, the sample cars do not contain an adsorbent/absorbent material. Instead, the "outside" dirt, which contains the leaked substance, filters through the perforations of the pipe and is deposited in the sample cars, thus creating the sample to be analyzed.

In an alternative embodiment, anodes, electrodes or other reference materials may be positioned in pipes 12 or cars 22. Also, cars 22 could then themselves be utilized as anodes, and anodes' backfill can be used as a reference material.

Series of sample cars 22 are attached by at least one end (preferably both ends) to disposing and retrieving device 26, which preferably comprises cable, but may be other devices (e.g. cording, metal cable, plastic, string etc.). This disposing and retrieving device may be removable, or may be permanently fixed to the sample cars. Alternatively, length of sample cars has a retrieving loop 25 on one or both ends, to which a cable or hook attaches to pull the cars out of the pipe. Disposing and retrieving device 26 is either removably or permanently attached to a retracting activator 28 (i.e., a hand-or motor-driven crank). A preferred embodiment utilizes a shaft attached to a crank at each end of the pipe. As shown in FIG. 5, disposing and retrieving device 26 (i.e. cable) spools upon multiple reels (one for each cable), operable separately from each other. Alternatively, the spools are driven by a single activator. In the preferred embodiment, the cable is more than twice as long as the diameter of the holding structure. This allows for the length of sample cars to be pulled out while still leaving enough cable on the opposing shaft. Alternatively, sample cars have a magnet on one end, and are retrievable by use of an additional magnet. Yet another alternative is the placement of the adsorbent/absorbent material directly within a pipe which is then pushed into the perforated outer pipe.

As shown in FIG. 4, sample cars 22 are slidably positioned in pipe 12. This is accomplished in the preferred embodiment using wheels 27. Alternatively, sample cars are curved or provide a low-friction surface (such as Teflon) on the bottom for slidably positioning in the pipe, or are moveable by rotation of a tread, not unlike that seen on a tank or tractor.

To detect leaks, after a period of time the sample cars are retrieved from the pipe. The absorbent/adsorbent material is then removed (or, alternatively taken within the sample car) and transported to an analysis device for forensic analysis.

One method of testing the sample for leaks entails the procedure described previously in U.S. Pat. No. 5,344,781, to Kitchen et. al., entitled Detection and Prevention of Hydrocarbon Leakage from Underground Storage Tanks, hereby incorporated by reference in its entirety. Briefly, the soil is mixed with an extraction solvent in a solvent:soil ratio of approximately 1:2 by volume. Preferably, hexane is used, although benzene, toluene, chlorofluorocarbons, or any other hydrocarbon solvent which rapidly evaporates may be used. The solvent/soil combination is mixed for approximately three to five minutes, then filtered so that the resulting fluid drains into an evaporating dish. Once the fluid evaporates, the sample tests positive for hydrocarbons (or other substances). Likewise, other tests in the field (e.g. gas chromatography) may be utilized.

In use, at least one sample collection container containing an absorbent/adsorbent material is disposed within the pipe using the disposing/retrieving device. The sample container is positioned in accordance with a location delineator, so as to allow precise determination of the location of the container, and therefore location of the leak. Leaking substances from the holding structure or other areas flow into the perforated pipe, are deposited into the sample container, and are absorbed/adsorbed by the material within the sample container. After a specified time (e.g. six months to a year), the sample container is removed from the pipe using the retrieving device. The absorbent/adsorbent material is then analyzed, either on-site or at a distant location.

The design of the invention provides for an analysis which allows interpretation of whether the leak is from the holding structure, the environment, or the water table. It also allows determination of the age of the leak, the composition (i.e. oil, diesel gas), and the volume or significance of the leak.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for detecting leaks of fluid holding structures, said apparatus comprising:

at least one perforated pipe disposed underneath the holding structure;

at least one sample container removably positionable within said pipe; and an absorbent/adsorbent material disposed within said sample container, wherein said absorbent/adsorbent material comprises at least one material selected from the group consisting of bentonite and sand.

2. The apparatus of claim 1 wherein said pipe is disposed horizontally beneath the holding structure.

3. The apparatus of claim 1 wherein said pipe is disposed above a liner underneath the holding structure.

4. The apparatus of claim 1 comprising a plurality of pipes disposed approximately 1–8 feet apart.

5. The apparatus of claim 1 wherein said perforated pipe comprises at least one perforation style selected from the group consisting of slots, holes, and other apertures.

6. The apparatus of claim 1 wherein said sample container comprises a collection receptacle for dirt surrounding said pipe.

7. The apparatus of claim 1 wherein said sample container comprises a second pipe slidable in said perforated pipe.

8. The apparatus of claim 1 comprising a plurality of sample containers disposed at intervals within said pipe.

9. The apparatus of claim 1 wherein said sample container further comprises a location delineator for identification of positioning of said sample container.

10. The apparatus of claim 9 wherein said location delineator provides identification of a location of the leak.

11. The apparatus of claim 1 comprising a plurality of sample containers in series.

12. The apparatus of claim 11 wherein said sample containers are detachably connected to each other.

13. The apparatus of claim 1 wherein said sample container comprises at least one wheel.

14. The apparatus of claim 1 wherein said sample container comprises a low-friction, slidable bottom surface.

15. The apparatus of claim 1 further comprising an absorbent/adsorbent material disposed within said sample container.

16. The apparatus of claim 1 further comprising a compound indicator in said sample container for detecting a compound provided to the substance in the holding structure which is leaking.

17. The apparatus of claim 1 further comprising a reference material in said sample container for determining differences in electrical potential.

18. The apparatus of claim 1 wherein said sample container comprises a reference electrode.

19. The apparatus of claim 1 further comprising a disposing and retrieving device for said sample container to be disposed and retrieved in said pipe.

20. The apparatus of claim 19 wherein said sample container comprises at least one attachment selected from the group consisting of a loop, hook and magnet on at least one end for retrieving said container.

21. The apparatus of claim 19 wherein said disposing and retrieving device comprises at least one pull selected from the group consisting of cable, string and cord.

22. The apparatus of claim 19 further comprising a disposing and retrieving activator to which said disposing and retrieving device is attached.

23. The apparatus of claim 22 wherein said disposing and retrieving activator comprises a spool.

24. The apparatus of claim 22 comprising an independently-controlled activator for each pipe.

25. The apparatus of claim 24 wherein said independently-controlled activators share a common spool.

26. A method for detecting leaks from fluid holding structures, the method comprising the following steps:

(a) placing at least one pipe underneath the holding structure;

(b) disposing at least one sample container within the pipe;

(c) collecting at least one sample from around the pipe into the sample container;

(d) retrieving the sample container; and (e) analyzing the sample to detect the leaked substance; and wherein the step of collecting at least one sample from around the pipe into the sample container comprises collecting the leaked substance into an absorbent/adsorbent material comprising at least one material selected from the group consisting of bentonite and sand.

27. The method of claim 26 wherein the step of placing at least one pipe underneath the holding structure comprises placing a perforated pipe underneath the holding structure.

28. The method of claim 26 wherein the step of placing at least one pipe underneath the holding structure comprises placing at least one pipe above a liner underneath the holding structure.

29. The method of claim 26 wherein the step of placing at least one pipe underneath the holding structure comprises placing more than one pipe approximately 1–8 feet apart underneath the holding structure.

30. The method of claim 26 wherein the step of placing at least one pipe underneath the holding structure comprises placing at least one pipe horizontally underneath the holding structure.

31. The method of claim 26 wherein the step of disposing at least one sample container within the pipe comprises disposing at least one sample container comprising an absorbent/adsorbent material.

32. The method of claim 26 wherein the step of disposing at least one sample container within the pipe comprises disposing a plurality of sample containers in series.

33. The method of claim 26 wherein the step of disposing at least one sample container within the pipe comprises disposing a second pipe slidable in the perforated pipe.

34. The method of claim 32 wherein the step of disposing the sample containers within the pipe comprises disposing sample containers detachably connected to each other.

35. The method of claim 26 wherein the step of disposing the sample containers within the pipe comprises disposing sample containers at intervals.

36. The method of claim 32 wherein the step of disposing at least one sample container within the pipe comprises disposing at least one sample container comprising a location delineator for identification of placement within the pipe.

37. The method of claim 26 wherein the step of disposing at least one sample container within the pipe comprises disposing at least one sample container comprising at least one wheel.

38. The method of claim 26 wherein the step of disposing at least one sample container within the pipe comprises disposing at least one sample container comprising a low-friction bottom surface.

39. The method of claim 26 wherein the step of disposing at least one sample container within the pipe comprises disposing at least one sample container comprising a curved bottom surface.

40. The method of claim 26 wherein the step of collecting at least one sample from around the pipe into the sample container further comprises collecting in a container comprising a compound indicator.

41. The method of claim 26 wherein the step of collecting at least one sample from around the pipe into the sample container further comprises collecting in a container comprising a reference material for determining a difference in electrical potential.

42. The method of claim 26 wherein the step of collecting at least one sample from around the pipe into the sample container further comprises collecting in a container comprising a reference electrode.

43. The method of claim 26 wherein the step of collecting at least one sample from around the pipe into the sample container comprises collecting the dirt that passes through the perforations.

44. The method of claim 26 wherein the step of retrieving the sample cars comprises retrieving with a disposing and retrieving device.

45. The method of claim 26 wherein the step of retrieving the sample container comprises retrieving the sample container comprising at least one attachment on at least one end selected from the group consisting of a loop, a hook, and a magnet.

46. The method of claim 44 wherein the step of retrieving the sample container comprises retrieving with at least one pull selected from the group consisting of cable, string, and cord.

47. The method of claim 46 wherein the step of retrieving the sample container further comprises retrieving the sample container with at least one pull connected to at least one retracting activator.

48. The method of claim 47 wherein the step of retrieving the sample container comprises retrieving the sample container with at least one pull connected to a spool.

49. The method of claim 48 wherein the step of retrieving the sample container comprises retrieving with at least one pull connected to at least one independently-controlled activator for each pipe.

50. The method of claim 49 wherein the step of retrieving the sample container comprises retrieving with more than one pull connected to a common spool.

51. The method of claim 26 wherein the step of analyzing the sample to detect the leaked substance comprises analyzing the absorbent/adsorbent material.

52. The method of claim 26 wherein the step of analyzing the sample to detect the leaked substance comprises analyzing the dirt that passes through the perforations.

53. The method of claim 26 wherein the step of analyzing the sample to detect the leaked substance comprises analyzing the sample to detect a compound indicator in the substance.

54. The method of claim 26 wherein the step of analyzing the sample to detect the leaked substance comprises analyzing the sample to detect a reference material in the substance.

55. The method of claim 26 wherein the step of analyzing the sample to detect the leaked substance comprises analyzing the sample to detect the age of the substance.

56. The method of claim 26 wherein the step of analyzing the sample to detect the leaked substance comprises analyzing the sample to detect the composition of the substance.

57. The method of claim 56 wherein the step of analyzing the sample to detect the leaked substance comprises analyzing the sample using an extraction solvent to detect the composition of the substance.

58. The method of claim 57 wherein the step of analyzing the sample to detect the leaked substance comprises analyzing the sample using an extraction material.

59. The method of claim 56 wherein the step of analyzing the sample to detect the composition of the substance comprises analyzing the sample to detect the stored compound.

60. The method of claim 26 wherein the step of analyzing the sample to detect the leaked substance comprises analyzing the sample to detect the source of the substance.

61. The method of claim 26 wherein the step of analyzing the sample to detect the source of the substance comprises analyzing the sample to detect at least one source selected from the group consisting of a holding structure, a water table, and the environment.

62. The method of claim 26 wherein the step of analyzing the sample to detect a leaked substance comprises analyzing the sample to detect the volume of the leak.

63. An apparatus for detecting leaks of holding structures, said apparatus comprising:
    at least one perforated pipe disposed underneath the holding structure; and
    at least one sample container removably positionable within said pipe; and
    wherein said sample container comprises a low-friction, slidable bottom surface comprising Teflon®.

64. A method for detecting leaks from holding structures, the method comprising the following steps:
    (a) placing at least one pipe underneath the holding structure;
    (b) disposing at least one sample container within the pipe;
    (c) collecting at least one sample from around the pipe into the sample container;
    (d) retrieving the sample container; and
    (e) analyzing the sample to detect the leaked substance; and
    wherein the step of analyzing the sample to detect the leaked substance comprises analyzing the sample to detect the age of the substance.

* * * * *